US010430106B2

United States Patent
Carey et al.

(10) Patent No.: US 10,430,106 B2
(45) Date of Patent: Oct. 1, 2019

(54) POLICY BASED TIERED ALLOCATION FOR HYBRID STORAGE DEVICES

(71) Applicant: MICROSOFT TECHNOLOGY LICENSING, LLC, Redmond, WA (US)

(72) Inventors: Omar Carey, Redmond, WA (US); Rajsekhar Das, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/898,414

(22) Filed: Feb. 16, 2018

(65) Prior Publication Data

US 2019/0258419 A1    Aug. 22, 2019

(51) Int. Cl.
*G06F 13/00*    (2006.01)
*G06F 3/06*    (2006.01)

(52) U.S. Cl.
CPC ............ *G06F 3/0644* (2013.01); *G06F 3/068* (2013.01); *G06F 3/0631* (2013.01); *G06F 2212/217* (2013.01)

(58) Field of Classification Search
CPC .................... G06F 3/068; G06F 2212/217
See application file for complete search history.

(56) References Cited

U.S. PATENT DOCUMENTS

| 9,355,121 | B1 | 5/2016 | Scheer et al. | |
|---|---|---|---|---|
| 2011/0283137 | A1* | 11/2011 | Liu | G06F 3/0616 714/6.12 |
| 2012/0078980 | A1* | 3/2012 | Qiao | G06F 16/24556 707/812 |
| 2015/0347294 | A1* | 12/2015 | Ruan | G06F 13/102 711/103 |
| 2016/0314042 | A1* | 10/2016 | Plants | G06F 11/1068 |
| 2017/0139600 | A1* | 5/2017 | Ke | G06F 12/0246 |
| 2017/0206133 | A1* | 7/2017 | Haneda | G06F 11/1004 |
| 2018/0342261 | A1* | 11/2018 | Das | G11B 5/012 |

OTHER PUBLICATIONS

Chen, et al., "Hystor: Making the Best Use of Solid State Drives in High Performance Storage Systems", in Proceedings of the international conference on Supercomputing, May 31, 2011, pp. 22-32.

(Continued)

*Primary Examiner* — Sean D Rossiter
(74) *Attorney, Agent, or Firm* — Newport IP, LLC; David W. Foster

(57) ABSTRACT

In a hybrid storage device comprising a fast tier and a slow tier, utilization of the fast tier is improved by dividing the fast tier into zones, including a zone for filesystem metadata, a zone for fast data, and a spillover zone for metadata, fast data or a combination thereof. By reducing the size of zones used exclusively for one type of data, while allowing both metadata and fast data to be stored in the spillover zone when necessary, better use of the fast tier is achieved. In another embodiment, a filesystem allocator is passed a policy object from which bands of storage are enumerated. The filesystem allocator iterates over the enumerated bands, searching for space to satisfy the allocation request.

20 Claims, 14 Drawing Sheets

(56) References Cited

OTHER PUBLICATIONS

Liu, et al., "Macss: A metadata-aware combo storage system", In Proceeding of the International Conference on Systems and Informatics (ICSAI2012), May 19, 2012, 5 Pages.

Niu, et al., "Hybrid Storage Systems: A Survey of Architectures and Algorithms", In Journal of IEEE Access, vol. 6, Feb. 7, 2018, pp. 13385-13406.

"International Search Report and Written Opinion Issued in PCT Application No. PCT/US19/016942", dated Mar. 29, 2019, 12 Pages.

Salkhordeh, et al., "Operating system level data tiering using online workload characterization", In Journal of Supercomputing, vol. 71, Issue 4, Jan. 31, 2015, pp. 1534-1562.

\* cited by examiner

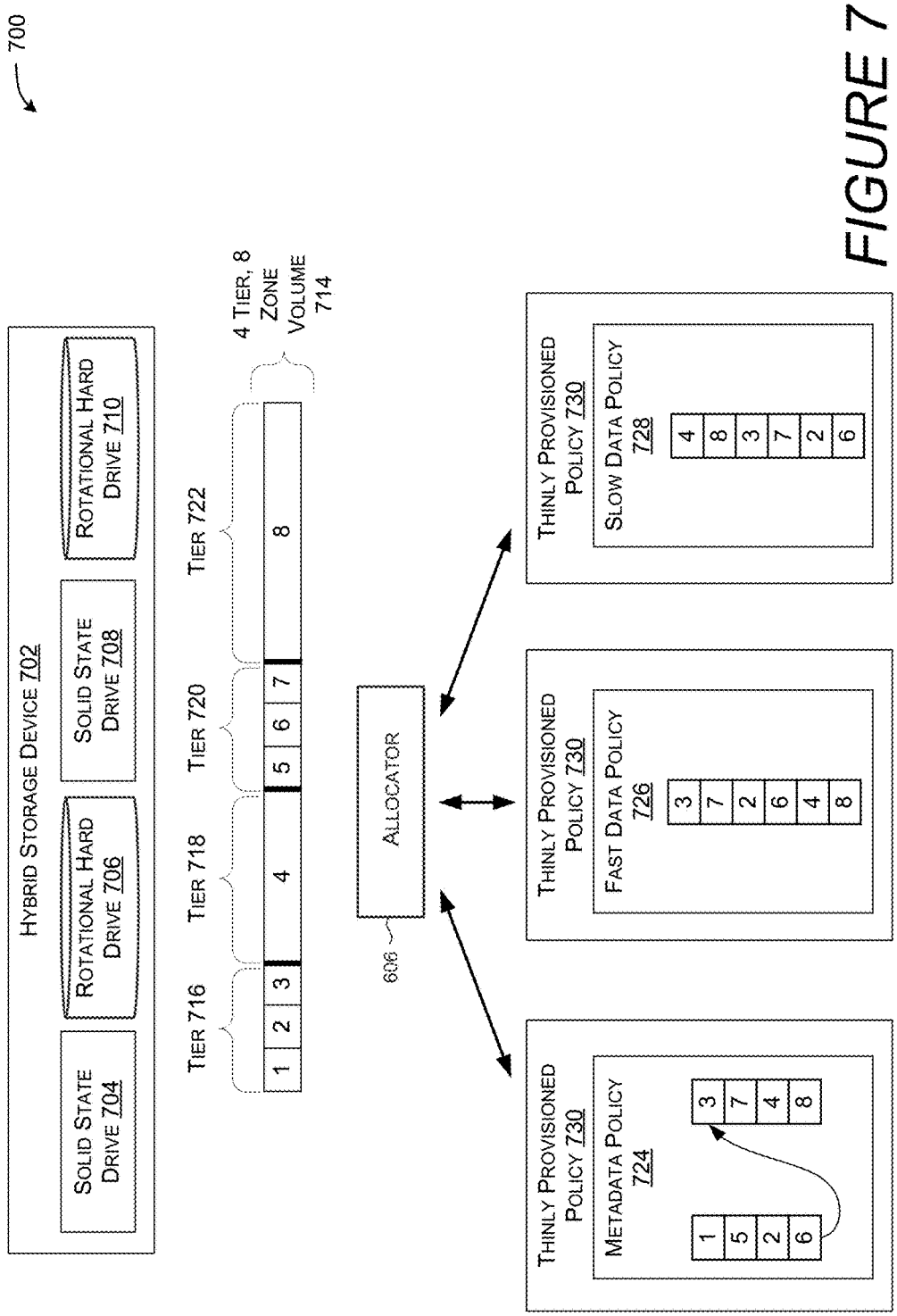

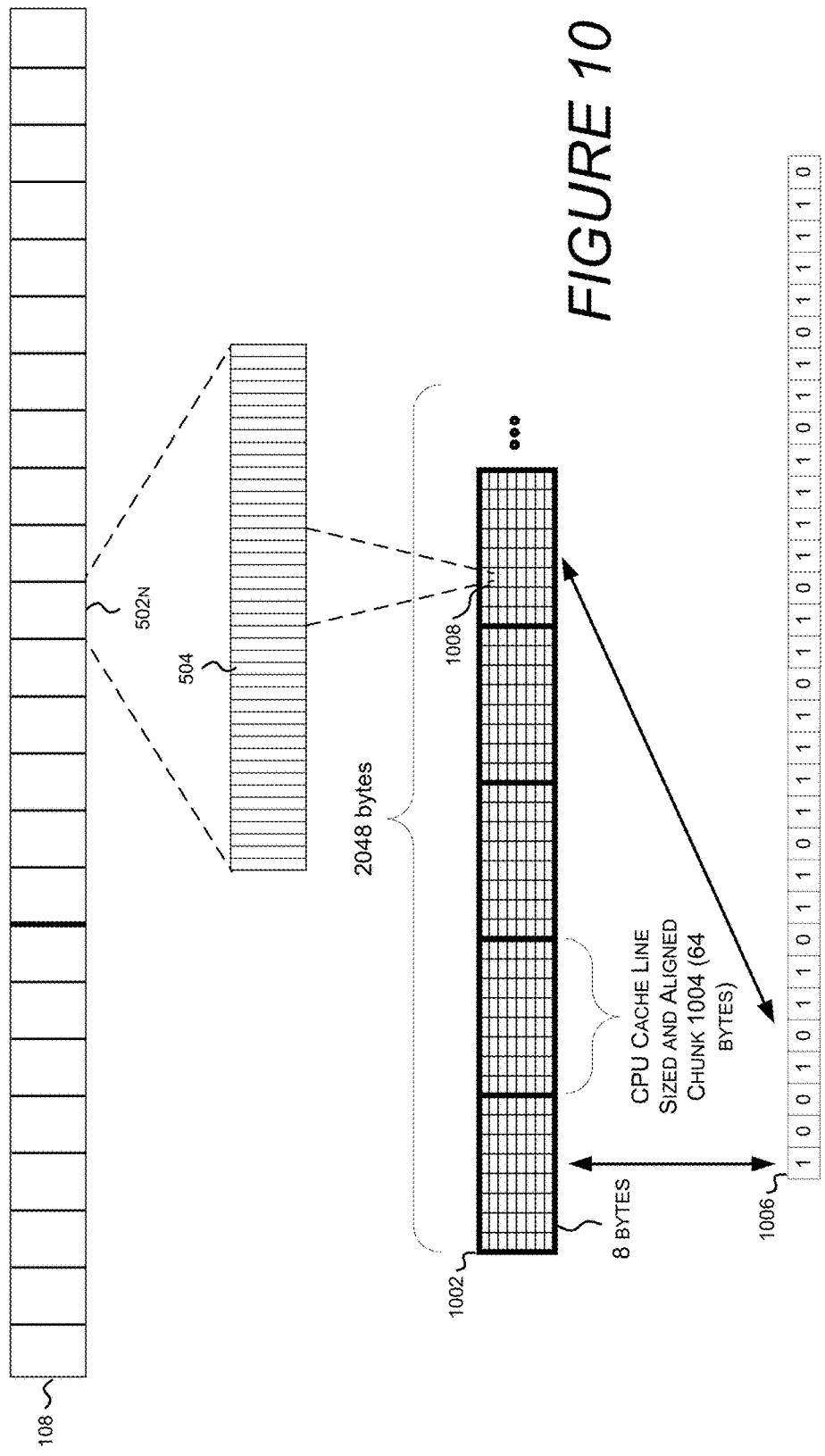

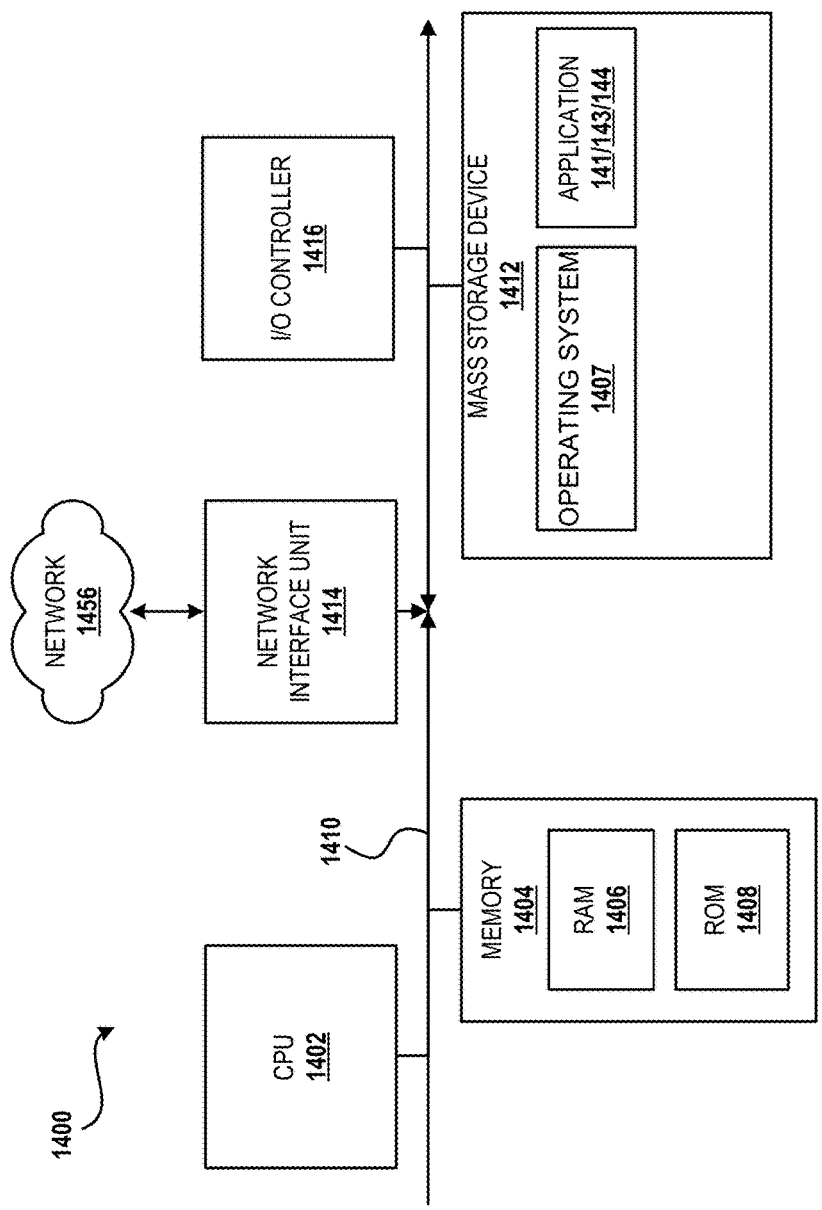

POLICY BASED TIERED ALLOCATION FOR HYBRID STORAGE DEVICES

BACKGROUND

Computer storage needs continue to increase, both in terms of capacity and performance. For many years hard disk drives based on rotating magnetic media dominated the storage market, providing ever increasing density and throughput combined with low latency. However, for certain applications even better performance was desired, and so solid-state drives (SSDs) were introduced that out-performed traditional hard drives, yet cost significantly more per byte of storage.

Some computing applications are more sensitive to differences in storage performance than others. For example, core operating system functions, low latency applications such as video games, storage focused applications such as databases, and the like benefit more from the increased performance of an SSD than web browsing, media consumption, and other less storage intensive tasks. Similarly, computing tasks that perform a significant number of random access storage operations, as opposed to streaming or contiguous operations, may benefit more from the reduced latency of an SSD. For example, executable files may benefit more from an SSD than data files, which may perform adequately when stored on a traditional rotating hard drive.

Given cost constraints and a desire to provide high-speed yet high-capacity storage devices, manufacturers have created hybrid storage devices that include an SSD for performance sensitive operations and a rotating hard drive for high-capacity requirements. Hybrid storage devices have also been created in software by filesystems that incorporate separate hard drive and SSD devices into a single logical storage volume. However, optimally allocating different types of data to differently performing components of a hybrid storage device remains an ongoing challenge.

One technique for increasing effective storage device performance is to allow concurrent access by multiple central processing units (CPUs), cores, or threads of execution. Challenges to allowing concurrent access include maintaining metadata consistency and preventing unintentional overwriting of data. Existing techniques include locking mechanisms that grant individual threads of execution exclusive access to a sensitive piece of metadata.

However, locks are a cause of performance problems, including stalls and context switches. Furthermore, when multiple CPUs or cores attempt to concurrently access the same piece of metadata, each core may load the metadata into a level 1 (L1) cache specific to that core, such that a modification by one core will invalidate a cache line in the other cores. This invalidation causes the core to stall as the recently modified cache line is loaded. As a result, latency and throughput are degraded.

It is with respect to these and other considerations that the disclosure made herein is presented.

SUMMARY

One goal of the disclosed embodiments is to improve the performance of a hybrid storage device. Hybrid storage devices combine multiple physical storage devices formatted as a single logical filesystem volume. Each of the physical storage devices, or tiers, may have different performance characteristics, and so selectively storing different types of data on differently performant tiers can have a significant impact on overall performance.

A filesystem controls how data is stored and retrieved from a storage device. For example, a filesystem may enable data to be stored in files, which are located in a directory structure. The filesystem tracks files and directories with metadata, which is also stored on the underlying storage device. Other types of metadata ensure integrity of the filesystem in the event of an unexpected error, provide for recovery of lost data, improve performance by enabling optimizations, and the like. Metadata has a central role in filesystem operations, and metadata operations are often performed while holding locks, increasing filesystem latency. As such, overall filesystem performance is sensitive to the performance metadata operations. Therefore, in one embodiment, metadata is preferentially stored on higher performant tiers, e.g. an SSD in a hybrid storage device containing an SSD and a rotational hard drive (HDD).

Additionally or alternatively, filesystem performance may be improved by distinguishing "hot" data from "cold" data, and preferentially storing "hot" data on a comparatively fast tier of a hybrid storage device. "Hot" data refers to user data that is frequently accessed or written to. "Cold" data, in contrast, is less frequently accessed or written to. Data may be distinguished as hot or cold based on empirical measures captured by the filesystem. In another embodiment, data may be distinguished as hot or cold based on file type, a user or application who created the file, or the like.

Filesystems use many techniques to optimize where files are stored. Many of these optimizations are most effective when data of the same type is stored together—e.g. contiguously on disk, or at least without data of another type interspersed. For example, an optimization that identifies cold data on the fast tier and copies it to the slow tier is improved by knowing that no metadata is found within the cold data. Other optimizations may rely on knowing that a particular region of the storage device only stores metadata. As such, existing filesystem implementations store data of the same type in contiguous regions of the storage device.

However, given that space on a fast tier is limited, restricting portions of the storage device to a particular type of data can leave the fast tier underutilized. For example, it is possible to calculate the theoretical maximum amount of system metadata necessary for a given volume size. However, this theoretical maximum is rarely if ever used, and so reserving a portion of a fast tier capable of storing the theoretical maximum amount of metadata precludes other uses of this fast storage capacity, e.g. for storing hot data.

In one embodiment, utilization of the fast tier is improved by dividing the fast tier into zones, one zone for metadata, one zone for fast data, and a spillover zone for metadata, fast data or a combination of both metadata and fast data, as needed. By reducing the size of zones used exclusively for one type of data, while allowing both metadata and fast data to be stored in the spillover zone when necessary, better use of the fast tier is achieved. A "slow zone" may also be created on the slower tier (backed by the slower physical storage device) as the primary location for storing "cold" data.

In one embodiment, each zone is composed of one or more bands. A band is a contiguous range of storage, e.g. 64 megabytes (MB). In one embodiment, allocations occur within a band, and cannot straddle bands, even if the bands are within the same zone. Within the spillover zone, metadata and fast data can be mixed within a given band, but as with zones, it is preferred that the band contain only data or metadata. Each band comprises a plurality of clusters, such as 4 kilobyte (kB) clusters typically found on hard drives and SSDs.

In one embodiment, zones are allocated when the logical storage volume is formatted. Zone types and sizes may be hard-coded or user specified. Zone sizes may be determined as a percentage of total volume capacity (e.g. 3%), an absolute value (e.g. 128 gigabytes), as a percentage of capacity of a specific tier (e.g. 20% of a fast tier), or some combination thereof. Specific zones, such as the metadata zone, may be allocated based on a theoretical maximum size, or a fraction of this amount. Spillover zones may be sized as a percentage of the zones that spillover into it—e.g. a spillover zone may be sized based on the size of the metadata zone, the fast data zone, or both. Zone sizes may also be determined based on empirical measures of how much space a volume of the same size typically requires.

A filesystem allocator is invoked by an application to locate and reserve space in a hybrid storage device. In one embodiment, the allocator is told the type of data that will be stored in the reserved space (e.g., metadata, fast data, slow data, etc.) and the amount of space to allocate. The allocator will then search for the requested amount of space based on the data type and zone availability. For example, a request to reserve 128 kB of metadata space would begin by searching for 128 kB of free space in the metadata zone. If the metadata zone is full, then the spillover zone would be searched, and if the spillover zone is full, the fast data zone would be searched. Finally, if the 128 kB can't be allocated out of the fast data zone, the slow data zone (i.e. on the slow tier) would be searched. However, this is but one example, and more or fewer tiers of varying capabilities are similarly contemplated, as are more or fewer zones with similar or different storage affinities.

In another embodiment, the allocator is told the amount of data to allocate and is passed a policy object. The policy object enumerates bands of storage, and the allocator iterates over the bands, searching them in turn for the requested amount of free space. If the allocator iterates over every band returned by the policy without finding an appropriate amount of free space, the allocator returns a disk full message, and the calling application is free try the allocation again with a different policy. In this embodiment, the allocator does not know the data type the allocation request is for, and it does not know which zone(s), or the types of zone(s), the enumerated bands come from. Instead, by selecting a policy, the calling application makes these determinations. This flexibility allows different allocation algorithms to be implemented without changing the allocator. Algorithms can be customized by a user, or provided by a third party. Moreover, different allocation algorithms can be dynamically selected at run time based on system feedback.

In one embodiment, a policy object includes a collection of zone identifiers. For example, if zones 1, 2, 3, and 4 (1=>metadata zone, 2=>spillover zone, 3=>fast data zone, 4=>slow data zone) are defined for a given volume, a fast data policy may include an array [3, 2, 4], indicating that "hot data" should be allocated out of the fast data zone 3 first, then from the spillover zone 2, and finally from the slow data zone 4.

In one embodiment, four policies are employed for a two-tiered hybrid storage device. One for metadata, one for fast data, one for slow data, and one for "forward progress". Forward progress should be used as a policy of last resort when space cannot be allocated by one of the other three policies. Forward progress treats the entire volume as a single zone, and enumerates bands from that zone without regard to which zone (e.g. metadata, spillover, . . . ) the band is also associated with. "Forward progress" improves the likelihood that an allocation will succeed, but has a higher likelihood of allocating space in a sub-optimal location (e.g. it may place metadata on the slow tier, or intermingle metadata and slow data, degrading some optimizations that would otherwise be available).

Other types of policies, backed by other types of data structures, are also contemplated. For example, a thinly provisioned volume is a storage volume having a defined size, while the storage device backing the volume has less than that defined amount of storage. For example, a thinly provisioned volume may be formatted as having 1 terabyte (TB) of data, when in fact it's backed by a 100 GB drive. A policy applied to a thinly provisioned drive must know not only what sectors are un-allocated, but which sectors are actually backed by real storage. In one embodiment, the data type specific policies listed above (e.g. metadata, slow data, . . . ) wrap a thinly provisioned policy, which ensures that only space backed by actual storage is returned.

As discussed above, once a particular band of data has been provided to an allocator, the allocator searches the band for available storage space. In one embodiment, each band is associated with a cluster allocation bitmap that holds the per-cluster allocation state for that band, and searching the band consists of searching the bitmap for enough contiguous un-allocated clusters to satisfy the allocation request. For example, a 64 MB band backed by a storage device that uses 4 kB clusters comprises 16,384 clusters. If each cluster is represented by one bit, 16,384 bits, or 2048 bytes, can represent the allocation state of the band.

In order to better utilize the storage device, many filesystems allow concurrent access to a cluster allocation bitmap. Existing implementations utilize interlocked operations to ensure the integrity of the bitmap is maintained. Interlocked operations utilize CPU primitives that enable atomic access (read/write/modify) to memory in a multithreaded environment, avoiding the need for locks or other higher-order synchronization techniques.

However, even if multithreaded access to the cluster allocation bitmap maintains filesystem integrity, concurrent access to the bitmap by multiple CPU cores can cause performance problems. Specifically, when different CPU cores load the same portion of the cluster allocation bitmap into their respective L1 caches, a write to the bitmap by one of the CPU cores will invalidate the L1 caches of the other cores, causing the other cores to stall while their caches are refreshed. This can cause significant performance issues, particularly when many CPU cores are attempting to allocate space out of the same band.

In one embodiment, these cache line invalidations and refreshes are mitigated by dividing cluster allocation bitmaps into L1 cache line sized and aligned chunks. Then, as threads attempt to access the cluster allocation bitmap, each thread is randomly directed to search a chunk of the bitmap. In this way, multiple threads are more likely to access different, non-overlapping portions of the cluster allocation bitmap, such that even if an allocation is made, another CPU core's L1 cache will not be invalidated. If a thread searches a chunk but does not find enough available clusters to perform the requested allocation, the thread may proceed to search subsequent chunks until an allocation is made or the band is exhausted.

This system does not eliminate the possibility of contention completely, as two threads may randomly be assigned to the same chunk, or as threads may encounter a chunk that cannot satisfy the requested allocation and searching continues in the subsequent chunk. In one embodiment, contention with another CPU core is detected when a thread tries to allocate a bit and fails. When this happens, the thread exits the band, retrieves the next band from the policy, and begins to search therein.

In one embodiment, the filesystem tracks which chunks of the cluster allocation bitmap have free space remaining. This information is accumulated over time as allocators fail to allocate from a given chunk. The number of threads allowed to access the cluster allocation bitmap may then be limited based on a number of chunks containing available clusters.

For example, in one embodiment, an allocator may allow E/2 threads access to a particular band, where E is the number of chunks in that band that have unallocated clusters. Once it is determined that a thread will be allowed through, a random number n from 0 to E-1 is generated, and the thread is assigned the n'th chunk that contains an available cluster.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter or a sequence of letters to refer to each individual item. Generic references to the items may use the specific reference number without the sequence of letters.

FIG. 7 shows a hybrid storage device containing additional physical storage devices, tiers, zones, and policies.

FIG. 8A shows a sequence in which zones are enumerated by a metadata policy.

FIG. 8B shows a sequence in which zones are enumerated by a fast data policy.

FIG. 8C shows a sequence in which zones are enumerated by a slow data policy.

FIG. 10 shows a cluster allocation bitmap and a bitmap that tracks which chunks of the cluster allocation bitmap contain unallocated space.

FIG. 14 is a computer architecture diagram illustrating an illustrative hardware and software architecture for a computing system capable of implementing aspects of the techniques and technologies presented herein.

DETAILED DESCRIPTION

Figure 1:
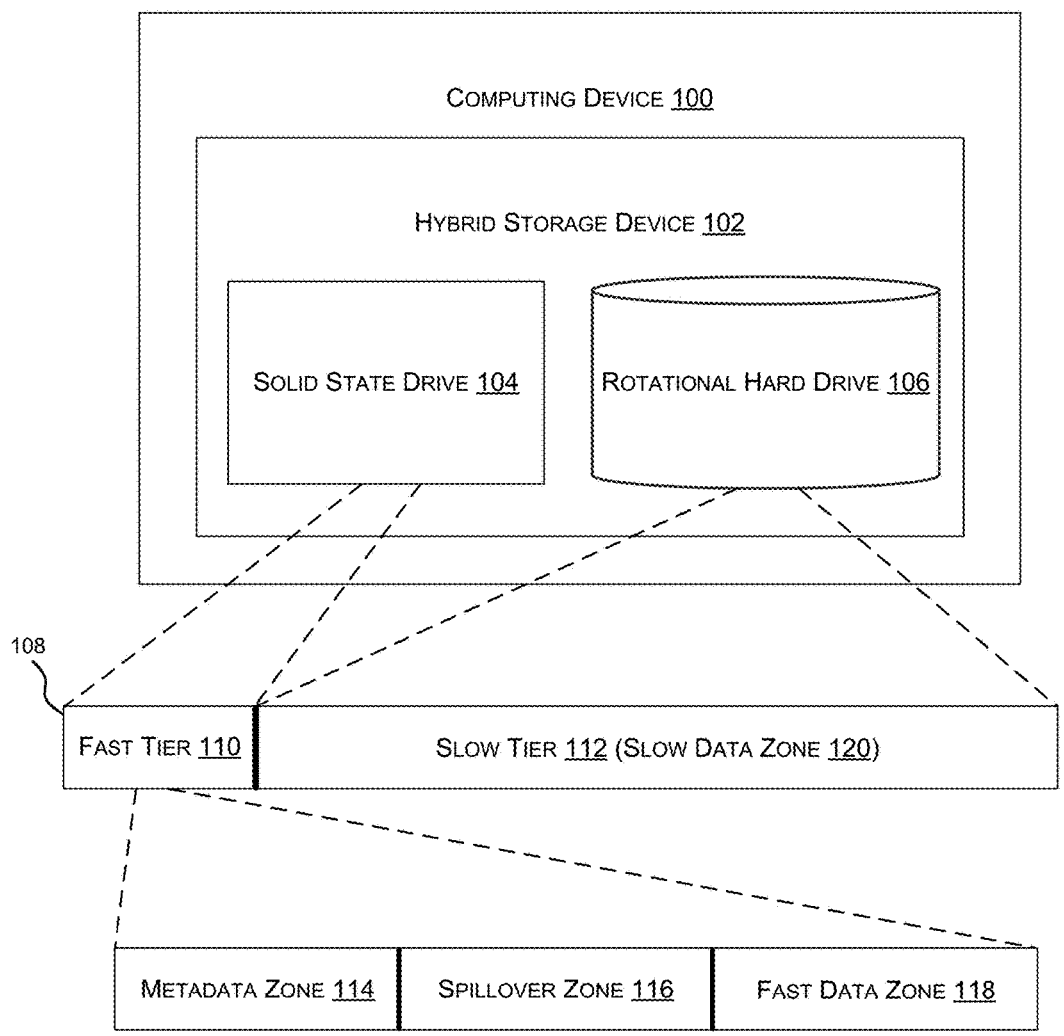
FIG. 1 shows a hybrid storage device formatted as a single volume having a fast tear and a slow tier, the tiers divided into zones for storing different types of data.

The following Detailed Description describes methods and systems for intelligent targeting of files needing attention.

As used herein, "volume" refers to a logical storage partition defined by a filesystem.

As used herein, "composite volume" refers to a logical drive that spans two or more physical storage devices.

As used herein, "tier" refers to a portion of a composite volume backed by a particular physical storage device. Tiers may be deemed fast or slow based on the respective attributes of the underlying physical storage device. Tiers may be evaluated in terms of latency, throughput, energy efficiency, or some combination thereof.

As used herein, "zone" refers to a portion of a tier with an affinity for a particular type of data or a particular mix of data types. For example, a metadata zone preferably stores system and/or user metadata, while a fast data zone preferably stores "hot" user data, and a spillover zone preferably stores metadata or "hot" user data or both, as required by circumstance. Zones have a preference for particular types or mixes of data, but under circumstances, such as the storage device approaching full capacity, may also store other types of data (e.g. when a "forward progress" policy is applied. Zones are composed of an integer number of bands.

As used herein, "metadata" refers data stored by the filesystem used to implement filesystem functionality. This is in contrast to user data, which stores data on behalf of users and applications. There are different types of metadata, e.g. system metadata and user metadata. System metadata refers to information kept by the filesystem to facilitate basic operations, including data allocation, ensuring system integrity, etc. User metadata refers to metadata that tracks file names, directory structures, and other user generated information.

As used herein, "user data" refers to content stored by the storage device for a user or an application. User data is typically stored in a file.

As used herein, "type of data" or "data type" refers to, for example, whether data is metadata, system metadata, user metadata, user data, fast user data, slow user data, etc. However, data stored on a storage device can be distinguished in many other ways, which are similarly contemplated.

As used herein, "band" refers to a contiguous allotment of physical storage, e.g. 64 MBs.

As used herein, "cluster allocation bitmap" refers to a bitmap that tracks which clusters in a band have been allocated and which remain free/unallocated.

As used here, "search space" refers to a range of bands mapped to a given tier, zone, band, or other range of storage space. A search space may include multiple zones, each zone comprised of one or more bands. An allocator may enumerate search spaces from a policy, and then enumerate bands from each search space. In one embodiment, what a search space represents is internal to a policy, such that the allocator does not know what a search space is mapped to on disk.

As used herein, "enumerate" refers to, as a producer, to provide a collection of objects one object at a time. When used by a consumer, "enumerate" refers to consuming collection of objects one object at a time.

As used herein, "iterate" refers to performing a function on each element of a set.

Turning now to FIG. 1, illustrated is computer 100 comprising a hybrid storage device 102. Hybrid storage device 102 includes a plurality of physical storage devices, such as solid state drive 104 and rotational hard drive 106. Hybrid storage device 102 may enclose the physical storage devices in a housing, and may be connected to a motherboard with a single interface. In another embodiment, disparate storage devices, i.e. storage devices that individually interface with the computer, or that are not included in the same housing, may be logically combined by a filesystem to form a hybrid storage device. While FIG. 1 depicts two physical storage devices, any number of, type of, and combination of physical storage devices are similarly contemplated.

The physical storage devices included in hybrid storage device 102 are formatted as a single logical volume 108. Presenting multiple physical storage devices as a single logical volume simplifies the user experience by avoiding concerns of which volume should store which files. At the same time, internally distinguishing between underlying storage devices allows for increased overall performance.

Logical volume 108 is separated into two tiers: fast tier 110, and slow tier 112. Fast tier 110 is backed by solid state drive 104, while slow tier 112 is backed by rotational hard drive 106. A tier may be deemed fast based on a measure of throughput, latency, or any other storage device attribute. FIG. 1 associates solid-state drive 104 with fast tier 110 because solid-state drives tend to provide superior performance characteristics, but it is also contemplated that a rotational hard drive could have superior performance characteristics, in which case the rotational hard drive would be associated with the fast tier 110. Similarly, new storage technologies may be introduced that surpass the performance of solid state drives and rotational hard drives, in which case they would be associated with the fast tier. Other embodiments may contemplate intermediate tiers, or tiers that are fast in one dimension but average or slow in another dimension. For example, if a rotational hard drive is deemed to have higher throughput than an SSD, the rotational hard drive may be associated with a fast throughput tier, and filesystem operations requiring high throughput but comparatively less random-access may be preferentially directed to the fast throughput tier.

Each tier is divided into one or more zones, where each zone has an affinity for a particular type of data. In this context an affinity means that the filesystem, in order to achieve optimizations, prefers to place particular types of data into corresponding zones. For example, metadata zone 114, spillover zone 116, fast data zone 118, and slow data zone 120, each have an affinity for metadata, a mix of metadata and fast ("hot") data, fast ("hot") data, and slow ("cold") data, respectively. This division of zones is but one example, and other types and number of zones are similarly contemplated. For example, a system metadata zone and a user metadata zone may be created to store the different types of metadata.

Figure 2:
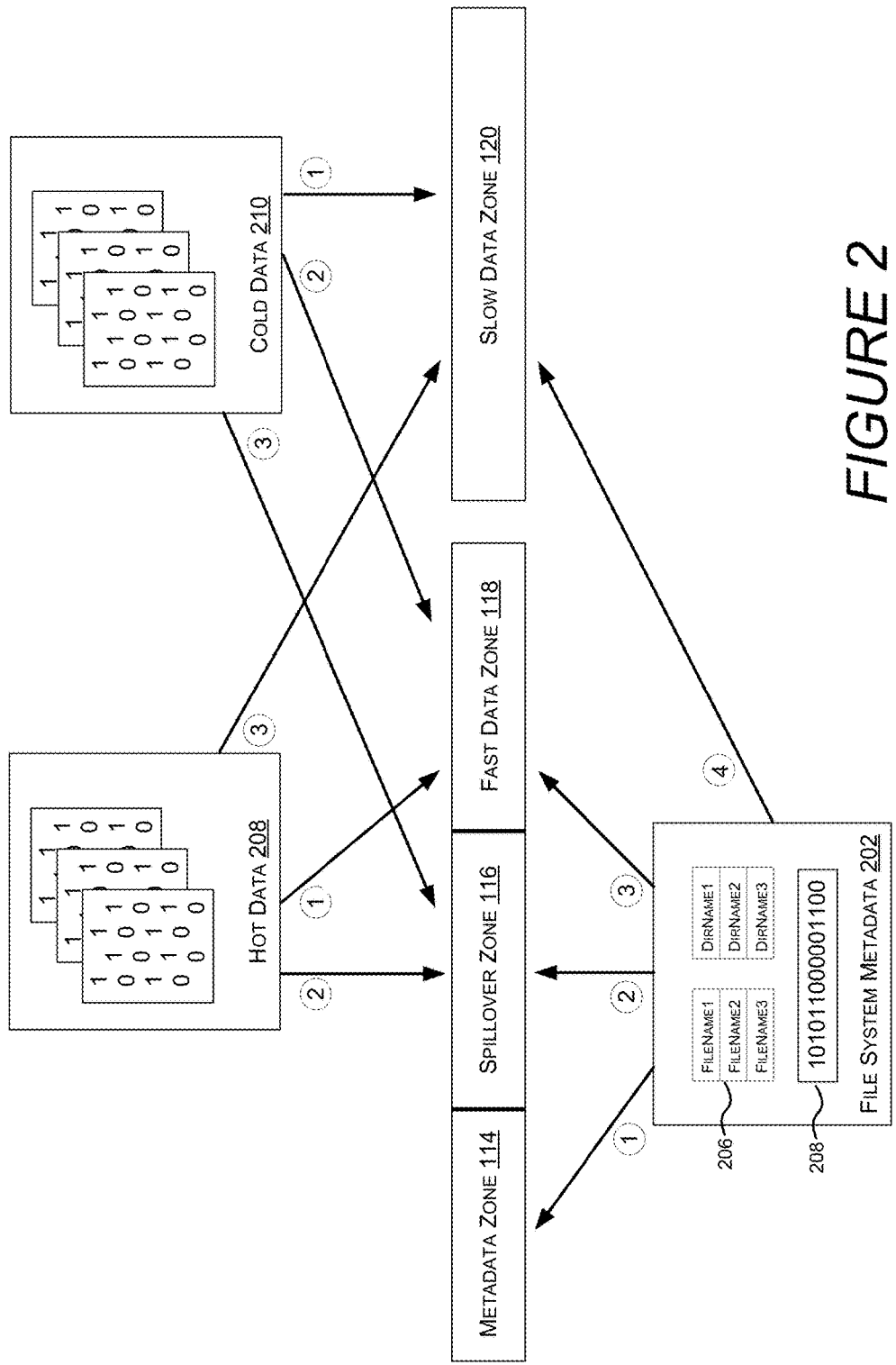
FIG. 2 shows different types of data and the order in which attempts are made to store the different types of data in different zones.

Turning now to FIG. 2, illustrated are different types of data and the order in which attempts are made to store the different types of data in different zones. For example, filesystem metadata 202 (hereinafter "metadata"), which includes system metadata 204 and user metadata 206, is preferably stored by an allocator in metadata zone 114. However, if metadata zone 114 cannot accommodate the request, the allocator will attempt to store metadata in spillover zone 116, which prefers to store a mix of metadata and user data. Storing metadata (and fast user data) in spillover zone 116 enables greater utilization of fast tier 110, while at the same time maintaining zones that contain all of one data type and as such are subject to greater optimizations. For example, without the flexibility of the spillover zone, if a metadata zone became full, subsequent allocations for metadata would be drawn from anywhere in the volume, including the slow tier, which could negatively impact performance.

If the spillover zone 116 is full, a third attempt is made to allocate the metadata in fast data zone 118. Fast data zone 118 is on the fast tier, so even though metadata will be interspersed with fast data, this is still preferable to storing metadata on the slow tier. However, if the fast data zone 118 is full, the fourth attempt to allocate metadata is made in the slow data zone 120.

Similarly, a filesystem allocator may first attempt to allocate space for hot data 208 in fast data zone 118. If fast data zone 118 is full, a second attempt to allocate space for hot data 208 will be performed in spillover zone 116. However, if spillover zone 116 is full, a third attempt will be made to allocate space for hot data 208 in slow data zone 120.

A filesystem allocator may first attempt to allocate space for cold data 210 in slow data zone 120. Although this consigns the cold data to the slow tier, and while it's likely that storing the cold data on the fast tier would improve performance related to that data, overall system performance would suffer as metadata and or hot data might be relegated to a slow tier, with performance costs that outweigh the performance gains of storing the cold data in the fast tier. However, if the slow data zone 120 is full, the allocator will attempt to allocate cold data 210 in the fast data zone 118. If the fast data zone 118 is full, a third attempt will be made to store cold data 210 in spillover zone 116.

Figure 3:
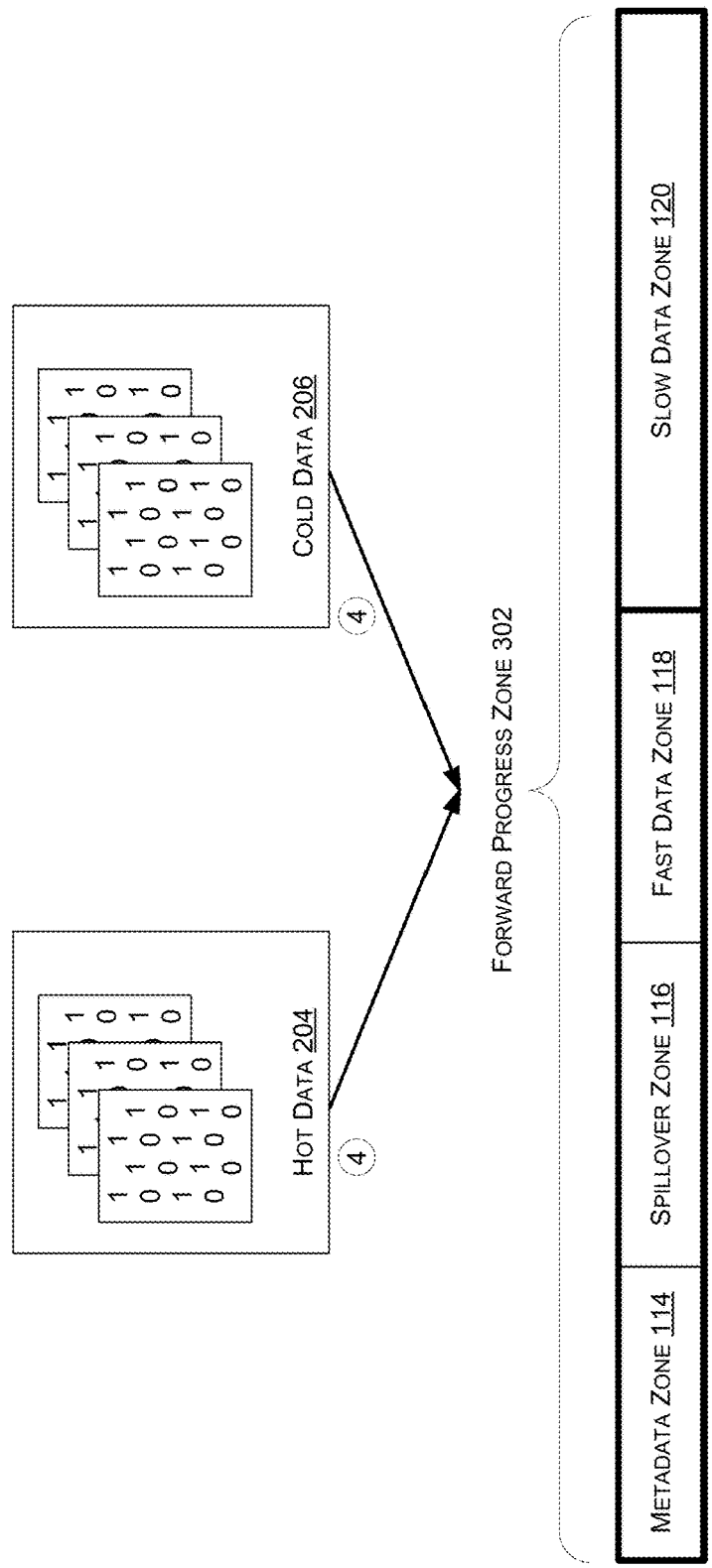
FIG. 3 shows different types of data stored as a last resort in a "forward progress" zone.

Turning now to FIG. 3, illustrated are different types of data stored as a last resort in a "forward progress" zone. In one embodiment, when space cannot be allocated for user data and any of fast data zone 118, spillover zone 116, or slow data zone 120, a "forward progress" zone 302 may be tried before the allocator returns indicating the storage device is full. A "forward progress" zone spans the entire volume, including both fast and slow tiers. While the "forward progress" zone 302 enables a last amount of data to be allocated, user data may, as a result, be stored in metadata zone 114, or cold data 206 may be stored in fast data zone 118. Neither of these scenarios is optimal from a performance standpoint.

Figure 4:
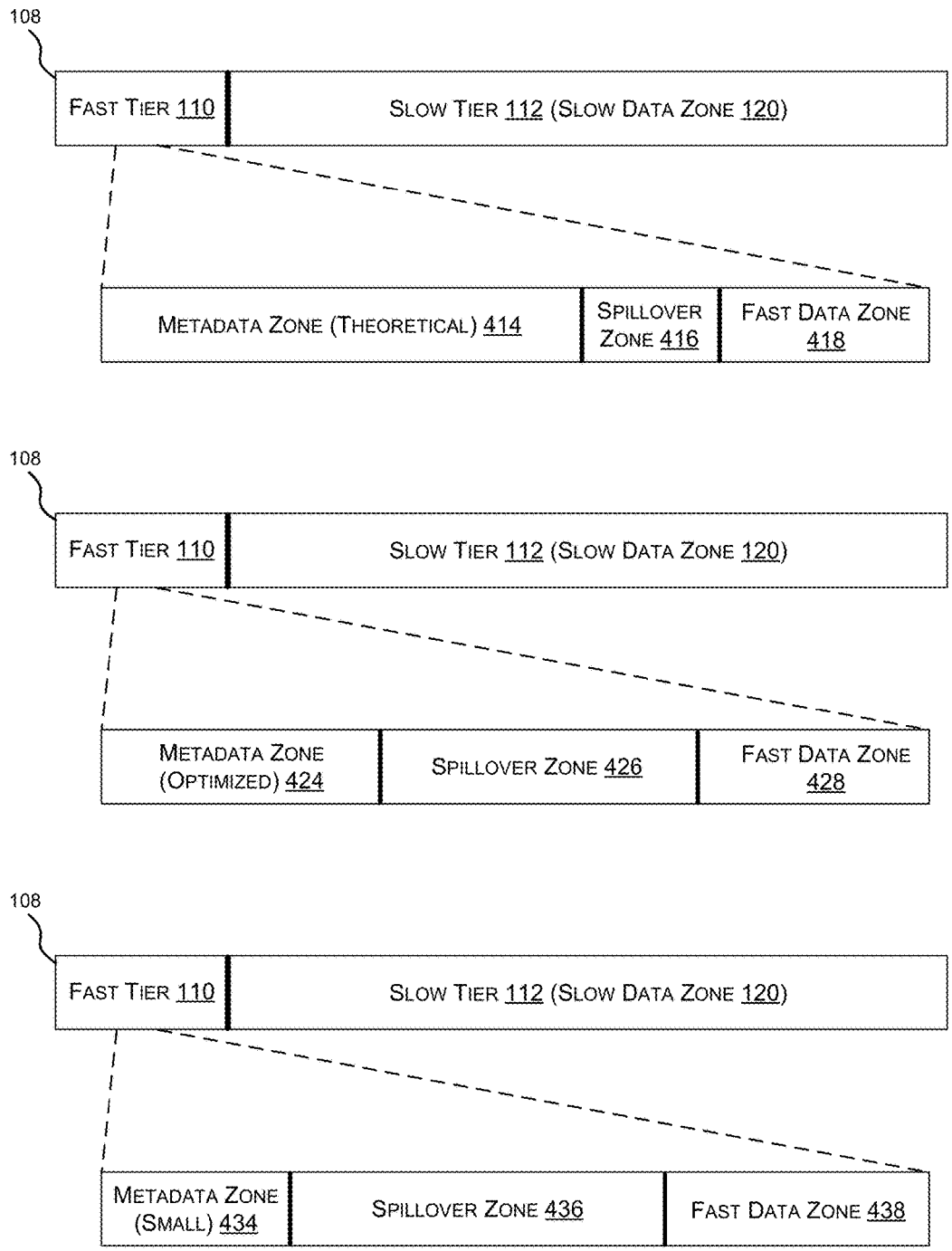
FIG. 4 shows different zone sizes for a given sized fast tier.

Turning now to FIG. 4, illustrated are different zone sizes within a fast tier. In one embodiment, zone types and sizes are determined when the volume 108 is formatted. The sizes assigned to different zones are important, because even with the flexibility of the spillover zone, over or under sizing the metadata zone or the fast data zone may cause a sub optimal allocation of available resources.

In one embodiment, metadata zone (theoretical) 414 is allocated with enough space to store the theoretical maximum amount of system metadata needed by the filesystem.

In one embodiment, the theoretical maximum amount of system metadata is based on the total capacity of the volume. The remainder of the fast tier 110 is allocated to spillover zone 416 and fast data zone 418.

While it is possible to allocate this much storage for metadata, the theoretical maximum amount of metadata is rarely if ever actually used. Furthermore, the amount of space needed for user metadata, e.g. file names and directory structures, cannot be predicted, as the number of files and the length of the file names cannot be predicted.

Therefore, one approach to determine a metadata zone size is to sample many real-world computing systems used for many different computing purposes, and determine an amount of metadata zone capacity that will satisfy most metadata requirements (e.g. an amount of capacity that will satisfy the metadata requirements of 70% of users). For example, metadata zone (optimized) 424 is allotted less space than the theoretical maximum metadata zone 414. However, many users will still not consume even this much metadata capacity, and those that do will have capacity in the spillover zone 426 to accommodate it. In one embodiment, fast data zone 428 may be made larger than fast data zone 418 due to the smaller footprint of metadata zone 424 and the increased size of spillover zone 426.

Zones may be allocated based on a percentage of capacity in the fast storage tier, based on a percentage of capacity in the volume, as a fixed amount (e.g. 64 GB), as a percentage of other zones, or the like. Zones may also be custom allocated by a system administrator when the volume is formatted. System administrators may have insight into the particular data set a specific hybrid storage device will encounter. For example, a volume that will store a small number of large executable files may require less metadata than a volume that will store a large number of files deeply nested into a directory structure. In one embodiment, a system administrator may allocate metadata zone (small) 434, leaving more room for spillover zone 436 and fast data zone 438.

Figure 5:
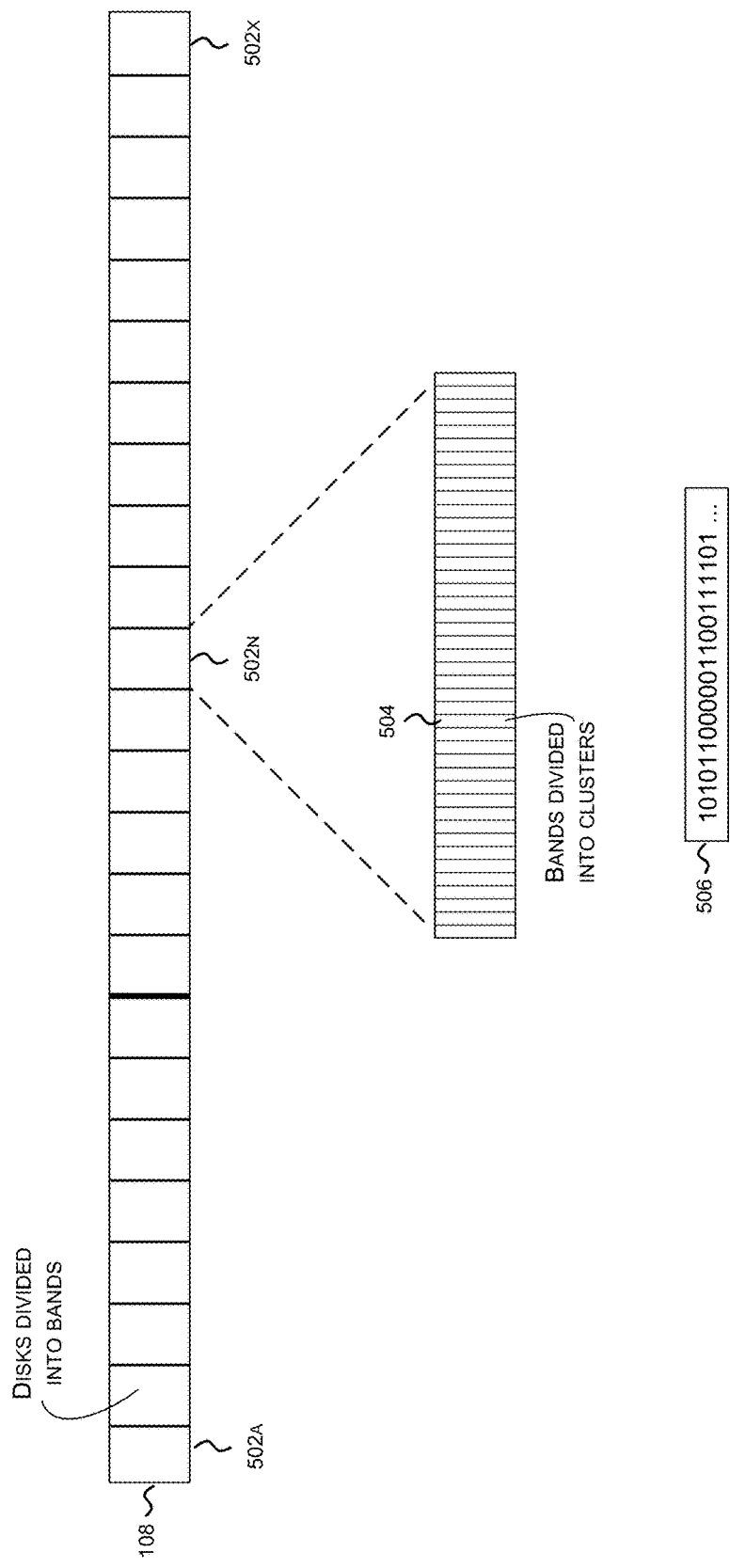
FIG. 5 shows a logical filesystem volume divided into bands, each of which are composed of clusters.

Turning now to FIG. 5, illustrated is a logical filesystem volume 108 divided into bands 502A . . . 502X. In one embodiment, bands each have the same length, e.g. 64 MB. In one embodiment, many filesystem operations are performed on bands. For example, zones are comprised of an integer number of bands, and allocators iteratively search bands for available space. Bands may also be a unit of capacity that optimizations are applied to.

In one embodiment, each band is composed of a number of clusters. Clusters are units of storage defined by the filesystem. For example, a cluster may include 4 kB of storage space. If a band contains 64 MB, and each cluster is 4 kB, then a band comprises 16384 clusters. The filesystem tracks which clusters of a given band are allocated by cluster allocation bitmap 506. Cluster allocation bitmap 506 contains one bit for each cluster of a band, where a value of '1' indicates cluster is already been allocated for some other use, and a value of '0' indicates a cluster is unallocated and available for use. The filesystem allocator searches for free space within a band by searching for enough consecutive '0's in the bitmap to satisfy the allocation request.

Figure 6:
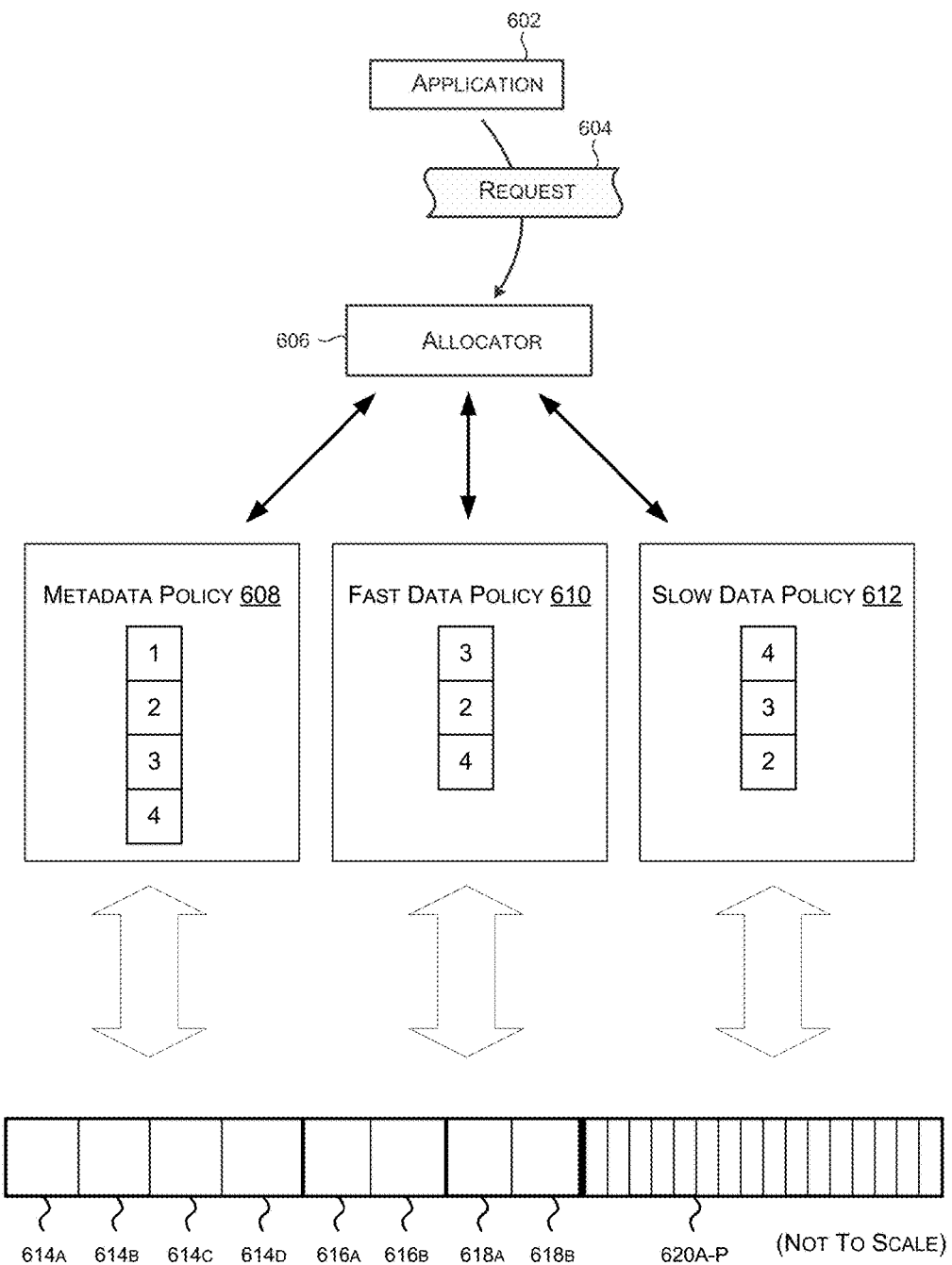
FIG. 6 shows an allocation request that utilizes a policy for enumerating bands.

Turning now to FIG. 6, illustrated is an allocation that utilizes a policy for enumerating cluster allocation bitmaps associated with bands. In one embodiment, application 602 sends allocation request 604 to allocator 606. The allocation request includes an amount of storage to be allocated, e.g. 50 kB, and a policy, e.g. metadata policy 608, fast data policy 610, or slow data policy 612. These policies then enumerate cluster allocation bitmaps based on the zone priorities they contain. For example, bands 614A-614D are associated with the metadata zone, and so cluster allocation bitmaps associated with these bands would be enumerated first by metadata policy 608. Similarly, bands 618A and 618B are part of the fast data zone, and so cluster allocation bitmaps associated with these bands would be enumerated first by fast data policy 610, followed by bands 616A and 616B from the spillover zone. Similarly, bands 620A-P are found in the slow data zone, and so cluster allocation bitmaps associated with these bands would be enumerated first by slow data policy 612.

Policies expose an interface that enumerates cluster allocation bitmaps associated with bands. Typically, this interface is consumed by allocator 606. The allocator 606 may then search the enumerated cluster allocation bitmaps for unallocated space to satisfy the allocation request. If the allocator 606 searches a band, but does not find available space to satisfy the allocation request, the allocator 606 requests another band from the policy. If the allocator 606 searches all bands returned by a given policy, the allocator will respond to the request 604 indicating that the allocation failed. Application 602 may then choose to initiate the request again with a different policy (e.g. a "forward progress" policy discussed above in conjunction with FIG. 2).

In this way, the allocator has no knowledge of tiers, zones, metadata, fast data, or other distinctions discussed above. Rather, these concepts are understood by policies, which determine the order in which bands are to be enumerated. As discussed above, separating the functions of determining which bands to search and the actual process of searching the bands has many beneficial effects. For example, policies can be tweaked dynamically based on feedback from the system. Additionally or alternatively, policies may alter how bands are enumerated based on anticipated workloads, specific hardware characteristics (e.g. faster or slower latency/throughput of the constituent hardware storage devices), number and type of storage tiers, etc.

In one embodiment, a policy exposes a collection of search spaces, and each search space exposes a collection of bands through which the allocator 606 may search for available storage capacity. A search space, for example, may represent all bands associated with a particular storage tier, while bands are contiguous regions of memory of fixed length as discussed above in conjunction with FIG. 5. In this embodiment, the allocator enumerates search spaces, i.e., the allocator requests a search space from the policy. Then, the allocator requests from the search space a band to search. If the allocator 606 finds space capable of satisfying the request 604, then the allocator will set bits in the corresponding cluster allocation bitmap in order to complete the allocation.

In one embodiment, a policy is implemented with an array of zone identifiers defining the order in which zones will be enumerated. For example, metadata policy 608 includes a four element array, containing the elements 1, 2, 3, and 4. Fast data policy 610 includes a three element array containing the elements 3, 2, 4, while slow data policy 612 includes a three element array containing the elements 4,3,2. Thus, if the request 604 included fast data policy 610, and allocator 606 begins enumerating bands from this policy, bands from zone 3 will be returned first, followed by bands from zone 2, followed by bands from zone 4.

Turning now to FIG. 7, illustrated is a hybrid storage device 702 containing additional physical storage devices, tiers, zones, and policies. Hybrid storage device 702 contains solid state drive 704, rotational hard drive 706, solid state drive 708, and rotational hard drive 710. This is another example of a hybrid storage device, although other configurations including other types and numbers of physical storage devices are similarly contemplated.

In one embodiment hybrid storage device 702 is formatted as a single volume 714. This volume is divided into four tiers: tier 716 corresponding to solid state drive 704, tier 718 corresponding to rotational hard drive 706, tier 720 corresponding to solid state drive 708, and tier 722 corresponding to rotational hard drive 710. Each of these tears is further divided into one or more zones numbered 1-8.

Each of the depicted policies 724, 726, and 728 are nested within thinly provisioned policy 730. While policies 608, 610, 612, 724, 726, and 728 are all based on arrays of zone identifiers, policies are not limited to this technique. For example, a policy may be defined that randomly returns bands from across the storage volume, or policies may be defined in terms of other policies (i.e. a nested policy).

Thinly provisioned policy 730 provides bands for storage volumes that are thinly provisioned. A thinly provisioned volume is formatted to have a certain capacity, while the actual physical storage device backing the volume has less than that capacity. For example, a volume may be formatted as having 1 TB of storage capacity, when in fact it is backed by a hard drive that has 100 GB of storage capacity. In these scenarios, not every cluster is actually backed by physical storage capacity, and so additional bitmaps are used identify clusters that actually represent available storage space on a physical storage device. Thus, in one embodiment, thinly provisioned policy 730 invokes a nested policy, e.g. one of policies 724, 726, 728. The hierarchy of policies is, in one embodiment, defined by the code invoking the allocator, such that the allocator is indifferent to how many nested policies, if any, are involved. The nested policy enumerates bands from zones according to the depicted order, returning them in turn to the thinly provisioned policy 730. The thinly provisioned policy 730 will then determine if that band is backed by physical storage capacity. If it is, the thinly provisioned policy 730 will return the band to the allocator 606. However, if the band is not backed by physical storage capacity, the thinly provisioned policy 730 will enumerate the next zone from the nested policy.

FIG. 7 also depicts allocator 606, via thinly provisioned policy 730, interacting with one of metadata policy 724, fast data policy 726, or slow data policy 728. These policies are similar to the policies discussed above in conjunction with FIG. 6, although configured to enumerate bands from the eight available tiers.

Figures 8A, 8B, 8C:
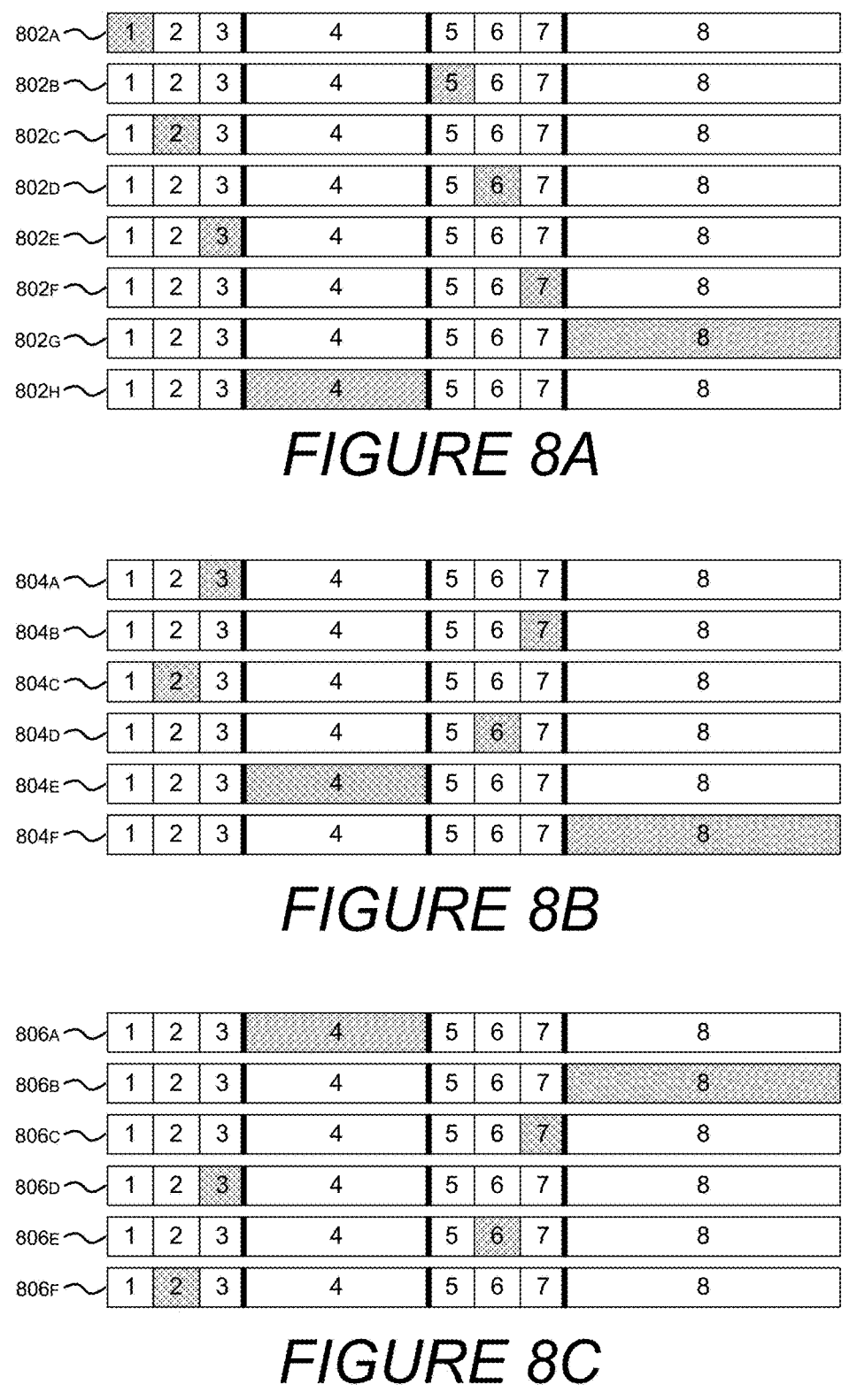

Turning now to FIG. 8A, illustrated is sequence in which zones are enumerated by a metadata policy. Storage volume 802A depicts a four tier, eight zone volume as described above in conjunction with FIG. 7. Zone 1 is highlighted because a policy, such as metadata policy 724, prefers to allocate metadata out of zone 1. However, if zone 1 cannot satisfy the allocation request, storage volumes 802B-802H highlight a progression of zones (1, 5, 2, 6, 3, 7, 8, 4) taken by metadata policy 724, where each zone has one or more bands to be enumerated. The final two zones, 8 and 4, are enumerated in an order different from metadata policy 724 to emphasize the flexibility of policy based allocators.

Turning now to FIG. 8B, illustrated is sequence in which zones are enumerated by a fast data policy. Storage volume 804A depicts a four tier, eight zone volume as described above in conjunction with FIG. 7. Zone 3 is highlighted because a policy, such as fast data policy 726, prefers to allocate metadata out of zone 3. However, if zone 3 cannot satisfy the allocation request, storage volumes 804B-804H highlight a progression of zones (3, 7, 2, 6, 4, 8) taken by fast data policy 726, where each zone has one or more bands to be enumerated.

Turning now to FIG. 8C, illustrated is sequence in which zones are enumerated by a slow data policy. Storage volume 806A depicts a four tier, eight zone volume as described above in conjunction with FIG. 7. Zone 4 is highlighted because a policy, such as slow data policy 728, prefers to allocate metadata out of zone 4. However, if zone 4 cannot satisfy the allocation request, storage volumes 806B-806H highlight a progression of zones (4, 8, 3, 7, 2, 6) taken by slow data policy 728, where each zone has one or more bands to be enumerated.

Figure 9A:
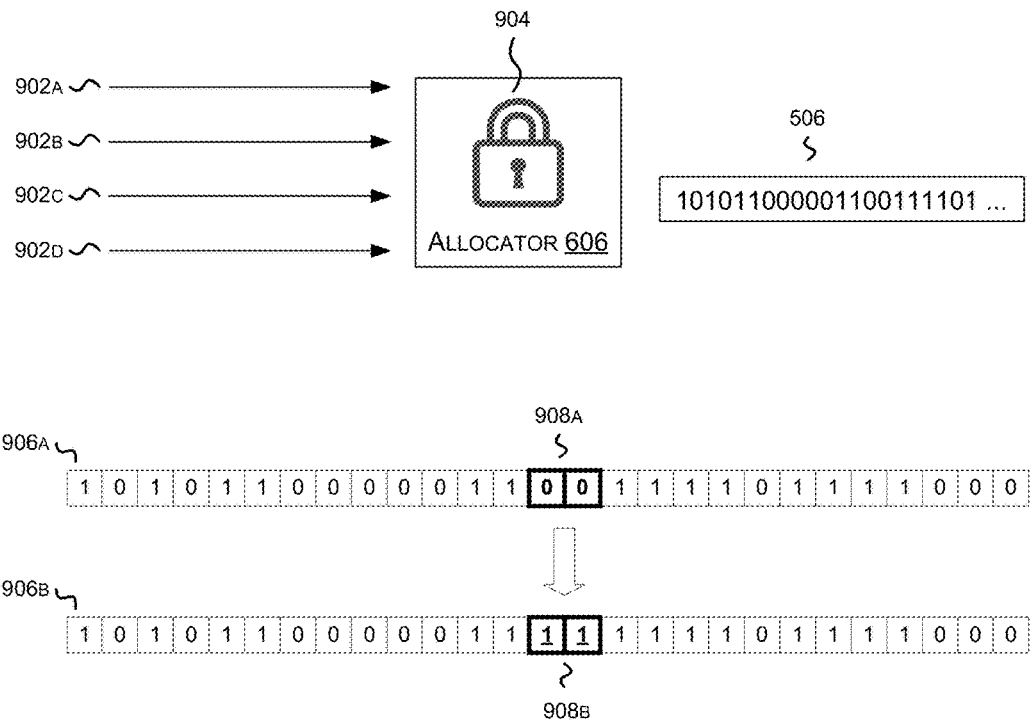
FIG. 9A shows multiple threads attempting to allocate data from the same band.

Turning now to FIG. 9A, illustrated are multiple threads 902A-902D attempting, via allocator 606, to access cluster allocation bitmap 506. In one embodiment, lock 904 allows only one of threads 902A-902D access to cluster allocation bitmap 506 at a time.

Cluster allocation bitmaps 906A and 906B show before and after states of a cluster allocation bitmap as two clusters are allocated. Specifically, clusters represented by bits 908A are '0', and as such are available. By setting these bits to '1', these clusters are allocated and marked as unavailable for other use.

Previous allocator implementations had different policies for multithreaded access based on the amount of storage requested. In one embodiment, when the amount of data requested required 32 or more clusters, allocator 606 would only allow one thread at a time to access the cluster allocation bitmap. However, if the allocation request could be satisfied with 31 or fewer clusters, the allocator would allow multiple threads to access the cluster allocation bitmap. When 31 or fewer clusters are sought, the allocator uses interlocked operators instead of locks, mutexes, semaphores, or other synchronization objects. Interlocked operations are thread safe memory operations that perform memory access. Interlocked operations are often referred to as "atomic" operations because they are guaranteed by the CPU to be performed without another thread interfering with the accessed memory. However, in some embodiments, interlocked operations are limited as to how much memory can be modified atomically. In one embodiment, interlocked operations can operate on up to 32 bits of information.

Figure 9B:
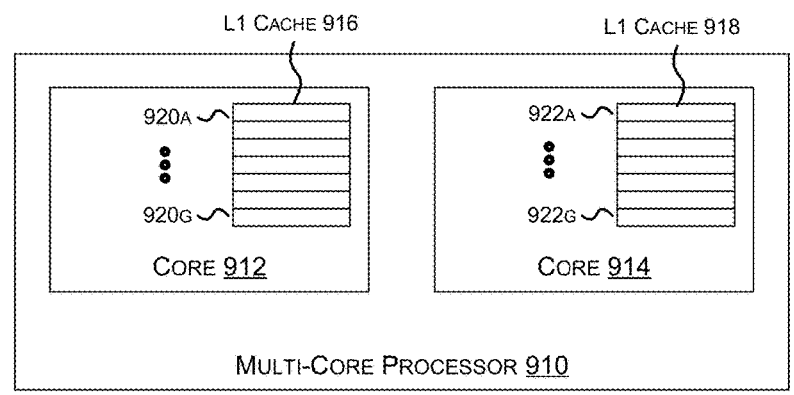
FIG. 9B shows a multicore central processing unit, each core having its own L1 cache.

Turning now to FIG. 9B, illustrated is a multicore central processing unit, each core having its own L1 cache. Multicore CPU 910 contains core 912, which includes L1 cache 916, and core 914, which includes L1 cache 918. L1 cache 916 includes cache lines 928A-928G, although more or fewer cache lines are similarly contemplated. L1 cache 918 includes cache lines 922A-922G.

Turning now to FIG. 10, illustrated is a cluster allocation bitmap 1002, which is broken down into chunks 1004, and a bitmap 1006 that tracks which chunks 1004 of the cluster allocation bitmap 1002 contain unallocated space. Also depicted is band 502N. Band 502N is illustrated as having a number of clusters 504.

Cluster allocation bitmap 1002 is divided into CPU cache line sized and aligned chunks 1004. Each chunk contains as many bits at will fit into a CPU cache line. As depicted in FIG. 10, if each band contains 64 MB of storage, and each cluster is 4 kB, then 16,384 bits (2048 bytes) are required to track the allocation status of each cluster for a given band. If each cache line can store 64 bytes, then cluster allocation bitmap is comprised of 2048/64=32 chunks. Chunk 1004, as depicted in FIG. 10, includes 64 rectangles, each representing a byte (8 bits). Byte 1008 is depicted as representing the status of eight clusters.

Bitmap 1006 contains as many bits as cluster allocation bitmap 1002 has chunks. Each bit represents whether a chunk, e.g. chunk 1004, has any unallocated capacity. In this depiction, a '1' signifies that the chunk is full, while a '0' indicates that the chunk has capacity remaining to be allocated.

Figure 11:
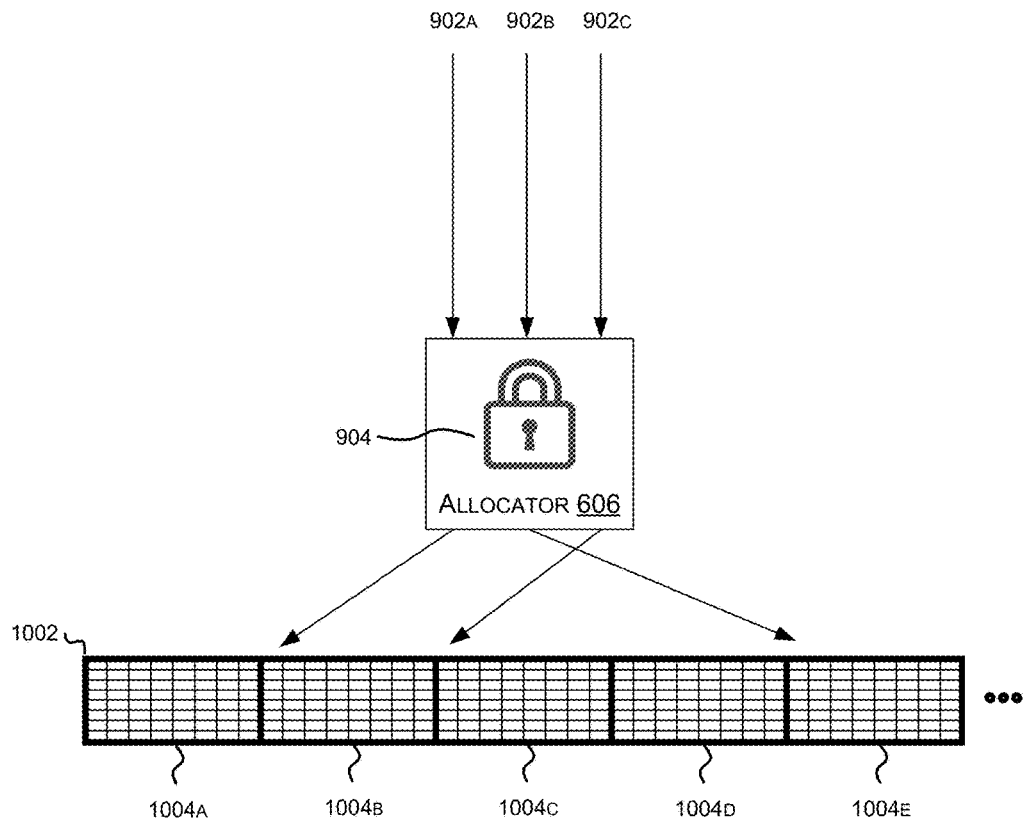
FIG. 11 shows multiple threads concurrently accessing different chunks of the cluster allocation bitmap.

Turning now to FIG. 11, illustrated are multiple threads 902A-902C concurrently accessing different chunks of the cluster allocation bitmap 1002. In one embodiment, each thread is randomly assigned to a chunk. For example-thread 902A may be assigned to chunk 1004B, thread 902B may be assigned to chunk 1004E, and thread 902C may be assigned to chunk 1004C. In this way, each thread operates within a portion of memory that is not also loaded into an L1 cache of another CPU.

Figure 12:
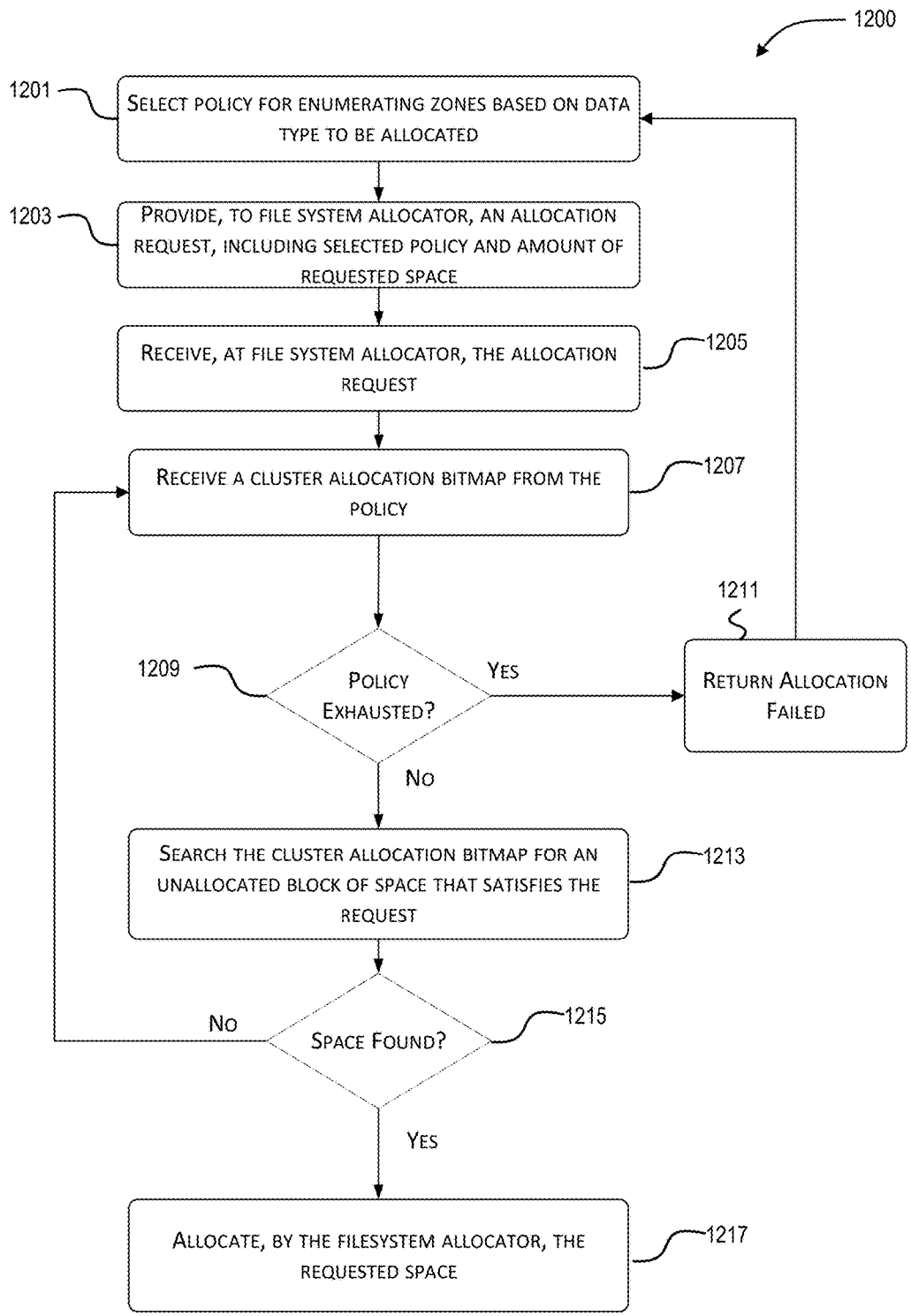
FIG. 12 is a flow diagram of an example method for policy-based tiered allocation for hybrid storage devices.

FIG. 12 is a flow diagram of an example method 1200 for policy based tiered allocation of hybrid storage devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 1201, a system (e.g., computer device 100), in response to an application request to allocate storage space, selects a policy for prioritizing zones based on a data type. As discussed above, a hybrid storage device may be formatted as a single logical file system volume, while each of the physical storage devices in the hybrid storage device are mapped to a tier, and each tier is divided into one or more zones. One or more zones may be associated with one or more types of data. For example, a metadata zone may be associated with the metadata datatype, a fast data zone may be associated with "hot" data, and a spillover zone may be associated with a mix of metadata and "hot" data.

As discussed above, a policy is an object provided to an allocator that enumerates cluster allocation bitmaps with which the allocator searches for unallocated storage space. In one embodiment, if the type of data being allocated is metadata, either system metadata or user metadata, a policy that prioritizes the metadata zone may be chosen. Similarly, if the type of data being allocated is "hot" data, then a policy that prioritizes a fast data zone may be chosen.

In one embodiment, a policy object includes an array of zone identifiers, establishing a priority in which cluster allocation bitmap's will be enumerated. However, a policy object may determine zone priority in other ways. For example, a policy object may determine zone priority based on remaining zone capacity, remaining tier capacity, and other dynamic feedback.

However, if a previous attempt was made to allocate the requested amount of space, and the request failed (see, e.g., block 1211), a second policy may be selected. For example, a "forward progress" policy may be selected that treats the entire logical file system volume as a single zone, ensuring that unallocated space, if it exists, will be found.

At block 1203, the selected policy is provided to a file system allocator. In one embodiment, the allocator is invoked, passing in an amount of requested space and the selected policy.

At block 1205, the allocation request is received at the file system allocator.

At block 1207, the file system allocator begins iterating over cluster allocation bitmaps enumerated from the policy. In one embodiment, the allocator receives a cluster allocation bitmap from the policy. In one embodiment, the file system allocator is unaware of which zones the policy prefers, or if the policy is based on zones at all.

At block 1209, the file system allocator determines if the policy is exhausted. A policy becomes exhausted when the allocator has enumerated all of the cluster allocation bitmaps the policy has to expose. If the policy is exhausted, the process continues to block 1211, where an indication that the allocation has failed is provided to the calling process. An indication that the allocation has failed is provided because, for this policy, the allocator was unable to secure enough unallocated space to satisfy the allocation request.

However, if the policy is not exhaustive, the process continues to block 1213. At block 1213, a cluster allocation bitmap returned by the policy is searched for an unallocated block of space that satisfies the allocation request. In one embodiment, searching the cluster allocation bitmap for unallocated block of space that satisfies the request comprises searching for a number of contiguous clusters that contain at least as much as was requested, e.g. by searching for a number of contiguous '0's in the cluster allocation bitmap.

At block 1215 a determination is made whether space satisfying the allocation request is found in this cluster allocation bitmap. If space is not found, then the process proceeds back to block 1207, causing the process of requesting and searching the cluster allocation bitmap to continue until the policy is exhausted or the requested space is found.

However, if space is found, the process returns to block 1217, where the identified clusters are allocated and returned to the calling process.

Instead, the file system allocator receives a sequence of cluster allocation bitmaps and, in turn, determines whether the requested storage space can be allocated out of a band that corresponds with one of the cluster allocation bitmaps.

Figure 13:
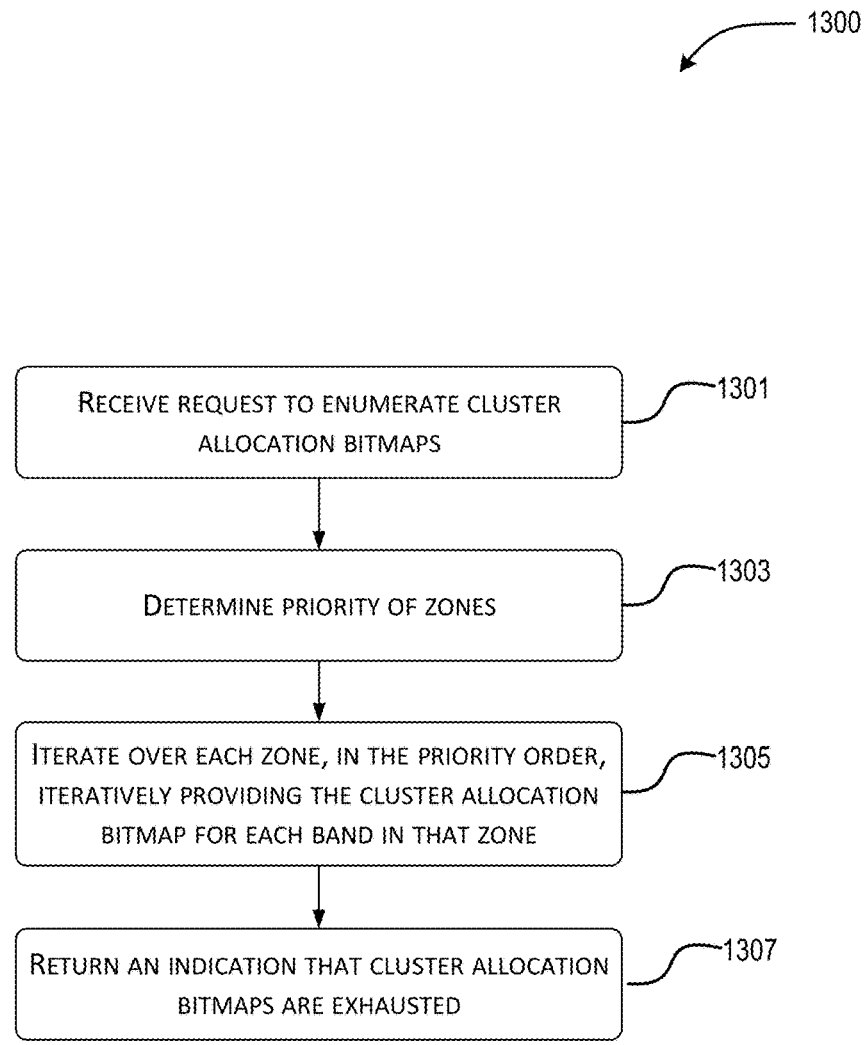
FIG. 13 is a flow diagram of an example method of a policy enumerating cluster allocation bitmaps.

FIG. 13 is a flow diagram of an example method 1300 for policy based tiered allocation of hybrid storage devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 1301, a request is received to enumerate cluster allocation bitmaps. In one embodiment, this request is received by a policy object, where the policy object was selected from a plurality of policy objects by the calling application.

At block 1303, the priority of zones is determined. In one embodiment, the zone priority is hardcoded as a collection of zone identifiers. For example, for a metadata policy, zone priority may be 1 (metadata zone), 2 (spillover zone), 3 (fast data zone), 4 (slow data zone). However, dynamic zone selection based on current operating conditions of the computer, e.g. zone capacity, are similarly contemplated. Furthermore, when the hybrid storage device has more than two physical storage devices, then the file system volume may contain more than two tiers, such that there may be multiple metadata zones, spillover zones, fast data zones, and/or slow data zones. In one embodiment, the zones are prioritized as discussed above in conjunction with FIGS. 8A-8C.

At block 1305, cluster allocation bitmaps are enumerated. In one embodiment, each zone is processed in order of the determined priority, and cluster allocation bitmaps associated with bands in that zone are provided to the allocator in turn.

At block 1307, an indication that cluster allocation bitmaps are exhausted is returned. If the allocator was able to allocate the requested, it would stop requesting the next cluster allocation bitmap. However, if all of the cluster allocation bitmaps have been provided to the allocator, and the allocator still asks for more, then the policy is exhausted as the process flows to block 1307.

FIG. 14 is a computer architecture diagram that shows an architecture for a computer 1400, e.g., the computer 100, capable of executing the software components described herein. The architecture illustrated in FIG. 14 is an architecture for a server computer, mobile phone, an e-reader, a smart phone, a desktop computer, a netbook computer, a tablet computer, a wearable device, a laptop computer, or another type of computing device suitable for executing the software components presented herein.

The computer architecture 1400 illustrated in FIG. 14 includes a central processing unit 1402 ("CPU"), a system memory 1404, including a random access memory 1406 ("RAM") and a read-only memory ("ROM") 1408, and a system bus 1410 that couples the memory 1404 to the CPU 1402. A basic input/output system containing the basic routines that help to transfer information between elements within the computer architecture 1400, such as during startup, is stored in the ROM 1408. The computer architecture 1400 further includes a mass storage device 1412 for storing an operating system 1407, other data, and one or more application programs 141, 143, and 144.

The mass storage device 1412 is connected to the CPU 1402 through a mass storage controller (not shown) connected to the bus 1410. The mass storage device 1412 and its associated computer-readable media provide non-volatile storage for the computer architecture 1400. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1400. For purposes of the claims, the phrase "computer storage medium," "computer-readable storage medium" and variations thereof, does not include waves, signals, and/or other transitory and/or intangible communication media, per se.

According to various configurations, the computer architecture 1400 may operate in a networked environment using logical connections to remote computers through the network 1456 and/or another network (not shown). The computer architecture 1400 may connect to the network 1456 through a network interface unit 1414 connected to the bus 1410. It should be appreciated that the network interface unit 1414 also may be utilized to connect to other types of networks and remote computer systems. The computer architecture 1400 also may include an input/output controller 1416 for receiving and processing input from a number of other devices, including a keyboard, mouse, or electronic stylus (not shown in FIG. 14). Similarly, the input/output controller 1416 may provide output to a display screen, a printer, or other type of output device (also not shown in FIG. 14).

It should be appreciated that the software components described herein may, when loaded into the CPU 1402 and executed, transform the CPU 1402 and the overall computer architecture 1400 from a general-purpose computing system into a special-purpose computing system customized to facilitate the functionality presented herein. The CPU 1402 may be constructed from any number of transistors or other discrete circuit elements, which may individually or collectively assume any number of states. More specifically, the CPU 1402 may operate as a finite-state machine, in response to executable instructions contained within the software modules disclosed herein. These computer-executable instructions may transform the CPU 1402 by specifying how the CPU 1402 transitions between states, thereby transforming the transistors or other discrete hardware elements constituting the CPU 1402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1400 in order to store and execute the software components presented herein. It also should be appreciated that the computer architecture 1400 may include other types of computing devices, including hand-held computers, embedded computer systems, personal digital assistants, and other types of computing devices known to those skilled in the art. It is also contemplated that the computer architecture 1400 may not include all of the components shown in FIG. 14, may include other components that are not explicitly shown in FIG. 14, or may utilize an architecture completely different than that shown in FIG. 14.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Example Clauses

Example Clause A, a method for policy based tiered allocation for a hybrid storage device, the method comprising: receiving, at a filesystem allocator, a request to allocate an amount of storage on the hybrid storage device, the request including a policy that enumerates cluster allocation bitmaps; receiving, from the policy, a cluster allocation bitmap, wherein the hybrid storage device comprises a plurality of zones including a metadata zone, a spillover zone, a fast data zone, and a slow data zone, wherein the policy orders the plurality of zones based on a data type associated with the allocation request, and wherein the policy enumerates one or more cluster allocation bitmaps from one or more of the ordered plurality of zones; searching the cluster allocation bitmap for an unallocated block of space that satisfies the amount of storage; and allocating the amount of storage from the unallocated block of space.

Example Clause B, the method of Example Clause A, wherein the hybrid storage device includes a plurality of physical storage devices formatted as a single file system volume, and wherein the metadata zone, the spillover zone, and the fast data zone are stored on an above-average performing of the plurality of physical storage devices.

Example Clause C, the method of Example Clause B, wherein allocating storage for filesystem metadata and hot data out of the spillover zone enables increased utilization of the above-average performing of the plurality of physical storage devices.

Example Clause D, the method of Example Clause A, wherein the data type comprises filesystem metadata, and wherein the plurality of zones are ordered as: the filesystem metadata zone, the spillover zone, the fast data zone, the slow data zone.

Example Clause E, the method of Example Clause A, wherein the data type comprises hot data, and wherein the plurality of zones are ordered as: the fast data zone, the spillover zone, the slow data zone.

Example Clause F, the method of Example Clause A, wherein the data type comprises cold data, and wherein the plurality of zones are ordered as: the slow data zone, the fast data zone, the spillover zone.

Example Clause G, a computing device for policy based tiered allocation for a hybrid storage device, the computing device comprising: one or more processors; a memory in communication with the one or more processors, the memory having computer-readable instructions stored thereupon which, when executed by the one or more processors, cause the computing device to: receive a request to enumerate cluster allocation bitmaps, wherein the hybrid storage device comprises a plurality of zones including a metadata zone, a spillover zone, a fast data zone, and a slow data zone; order the plurality of zones based on a data type associated with the allocation request; and enumerating one or more cluster allocation bitmaps from one or more of the ordered plurality of zones, wherein a filesystem allocator iteratively searches the enumeration of cluster allocation bitmaps until storage satisfying a storage request is allocated in one of the enumerated cluster allocation bitmaps.

Example Clause H, the computing device of Example Clause G, wherein the type of data includes one of filesystem metadata, hot data, or cold data, and wherein: for filesystem metadata, the plurality of zones are ordered as: the metadata zone, the spillover zone, the fast data zone, and then the slow data zone; for hot data, the plurality of zones are ordered as: the fast data zone, the spillover zone, and then the slow data zone; and for cold data, the plurality of zones are ordered as: the slow data zone, the fast data zone, and then the spillover zone.

Example Clause I, the computing device of Example Clause H, wherein the metadata zone, the fast data zone, the spillover zone, and the slow data zone are allocated when the filesystem volume is formatted.

Example Clause J, the computing device of Example Clause I, wherein the hybrid storage device includes a plurality of physical storage devices formatted as a single file system volume, the method further comprising: determining a theoretical maximum amount of system metadata for the file system volume; and allocating the metadata zone to have a size equal the theoretical maximum amount of system metadata multiplied by a defined percentage.

Example Clause K, the computing device of Example Clause J, wherein the defined percentage is 66%.

Example Clause L, the computing device of Example Clause G, wherein the plurality of zones are ordered in part based on an amount of unallocated space available in each of the plurality of zones.

Example Clause M, the computing device of Example Clause G, wherein the filesystem volume comprises a thinly provisioned volume, and wherein the enumerated one or more cluster allocation bitmaps are filtered to return cluster allocation bitmaps backed by the hybrid storage device.

Example Clause N, the computing device of Example Clause H, wherein the hybrid storage device includes a plurality of physical storage devices, including two or more high-performing storage devices and one or more slow performing storage devices, formatted as a single filesystem volume, wherein each of the two or more high-performing storage devices includes a metadata zone, a spillover zone, and a fast data zone, and wherein enumerating one or more cluster allocation bitmaps includes ordering zones from the two or more high-performing storage devices.

Example Clause O, a method for policy based tiered allocation for a hybrid storage device, the method comprising: providing, to a file system allocator, a request to allocate an amount of storage to a filesystem allocator, wherein the request includes a policy that enumerates cluster allocation bitmaps; wherein the filesystem allocator allocates the requested amount of storage by iteratively searching cluster allocation bitmaps enumerated by the policy for the requested amount of unallocated space; and wherein the policy enumerates cluster allocation bitmaps by ordering, based on a data type associated with the request, a plurality of zones included in the hybrid storage device, and enumerating, from each of the ordered plurality of zones, one or more cluster allocation bitmaps from that zone.

Example Clause P, the method of Example Clause O, wherein the hybrid storage device includes a higher performing physical storage device and a lower performing physical storage device, and wherein the higher performing physical storage device includes, of the plurality of zones, a metadata zone, a spillover zone, and a fast data zone, while the slower performing physical storage device includes, of the plurality of zones, a slow data zone.

Example Clause Q, the method of Example Clause O, wherein the higher performing physical storage device is higher performing in at least one of throughput or latency.

Example Clause R, the method of Example Clause O, further comprising: receiving an indication from the filesystem allocator that the allocation failed; selecting a different policy; and providing the allocation request to the filesystem allocator, wherein the allocation request includes the different policy.

Example Clause S, the method of Example Clause R, wherein the plurality of zones of the different policy includes single zone spanning the hybrid storage device.

Example Clause T, the method of Example Clause O, wherein the allocator iteratively searches cluster allocation bitmaps by enumerating one or more search spaces from the policy, and for each search space, enumerating one or more cluster allocation bitmaps.

While Example Clauses G through N are described above with respect to a computing device, it is also understood in the context of this disclosure that the subject matter of Example Clauses G through N can additionally and/or alternatively be implemented via a method, a system, and/or computer storage media.

The invention claimed is:

1. A method for policy based tiered allocation for a hybrid storage device, the method comprising:
    receiving, at a filesystem allocator, a request to allocate an amount of storage on the hybrid storage device, the request including a policy that enumerates cluster allocation bitmaps;
    receiving, from the policy, a cluster allocation bitmap, wherein the hybrid storage device comprises a plurality of zones including a metadata zone, a spillover zone, a fast data zone, and a slow data zone, wherein the policy orders the plurality of zones based on a data type associated with the allocation request, and wherein the policy enumerates one or more cluster allocation bitmaps from one or more of the ordered plurality of zones;
    searching the cluster allocation bitmap for an unallocated block of space that satisfies the amount of storage; and
    allocating the amount of storage from the unallocated block of space.

2. The method of claim 1, wherein the hybrid storage device includes a plurality of physical storage devices formatted as a single file system volume, and wherein the metadata zone, the spillover zone, and the fast data zone are stored on an above-average performing of the plurality of physical storage devices.

3. The method of claim 2, wherein allocating storage for filesystem metadata and hot data out of the spillover zone enables increased utilization of the above-average performing of the plurality of physical storage devices.

4. The method of claim 1, wherein the data type comprises filesystem metadata, and wherein the plurality of zones is ordered as: the metadata zone, the spillover zone, the fast data zone, the slow data zone.

5. The method of claim 1, wherein the data type comprises hot data, and wherein the plurality of zones is ordered as: the fast data zone, the spillover zone, the slow data zone.

6. The method of claim 1, wherein the data type comprises cold data, and wherein the plurality of zones is ordered as: the slow data zone, the fast data zone, the spillover zone.

7. A computing device for policy based tiered allocation for a hybrid storage device, the computing device comprising:
    one or more processors;
    a memory in communication with the one or more processors, the memory having computer-readable instructions stored thereupon which, when executed by the one or more processors, cause the computing device to:
        receive a request to enumerate cluster allocation bitmaps, wherein the hybrid storage device comprises a plurality of zones including a metadata zone, a spillover zone, a fast data zone, and a slow data zone;
        order the plurality of zones based on a data type associated with the request to enumerate; and
        enumerate one or more cluster allocation bitmaps from one or more of the ordered plurality of zones, wherein a filesystem allocator iteratively searches the enumeration of cluster allocation bitmaps until storage satisfying a storage request is allocated in one of the enumerated cluster allocation bitmaps.

8. The computing device of claim 7, wherein the type of data includes one of filesystem metadata, hot data, or cold data, and wherein:
    for filesystem metadata, the plurality of zones is ordered as: the metadata zone, the spillover zone, the fast data zone, and then the slow data zone;
    for hot data, the plurality of zones is ordered as: the fast data zone, the spillover zone, and then the slow data zone; and
    for cold data, the plurality of zones is ordered as: the slow data zone, the fast data zone, and then the spillover zone.

9. The computing device of claim 8, wherein the metadata zone, the fast data zone, the spillover zone, and the slow data zone are allocated when the filesystem volume is formatted.

10. The computing device of claim 9, wherein the hybrid storage device includes a plurality of physical storage devices formatted as a single file system volume, the method further comprising:
    determining a theoretical maximum amount of system metadata for the file system volume; and
    allocating the metadata zone to have a size equal the theoretical maximum amount of system metadata multiplied by a defined percentage.

11. The computing device of claim 10, wherein the defined percentage is 66%.

12. The computing device of claim 7, wherein the plurality of zones is ordered in part based on an amount of unallocated space available in each of the plurality of zones.

13. The computing device of claim 7, wherein the filesystem volume comprises a thinly provisioned volume, and wherein the enumerated one or more cluster allocation bitmaps are filtered to return cluster allocation bitmaps backed by the hybrid storage device.

14. The computing device of claim 8, wherein the hybrid storage device includes a plurality of physical storage devices, including two or more high-performing storage devices and one or more slow performing storage devices, formatted as a single filesystem volume, wherein each of the two or more high-performing storage devices includes a metadata zone, a spillover zone, and a fast data zone, and wherein enumerating one or more cluster allocation bitmaps includes ordering zones from the two or more high-performing storage devices.

15. A method for policy based tiered allocation for a hybrid storage device, the method comprising:

providing, to a file system allocator, a request to allocate an amount of storage to a filesystem allocator, wherein the request includes a policy that enumerates cluster allocation bitmaps;

wherein the filesystem allocator allocates the requested amount of storage by iteratively searching cluster allocation bitmaps enumerated by the policy for the requested amount of unallocated space; and wherein the policy enumerates cluster allocation bitmaps by ordering, based on a data type associated with the request, a plurality of zones included in the hybrid storage device, and enumerating, from each of the ordered plurality of zones, one or more cluster allocation bitmaps from that zone.

16. The method of claim 15, wherein the hybrid storage device includes a higher performing physical storage device and a lower performing physical storage device, and wherein the higher performing physical storage device includes, of the plurality of zones, a metadata zone, a spillover zone, and a fast data zone, while the slower performing physical storage device includes, of the plurality of zones, a slow data zone.

17. The method of claim 16, wherein the higher performing physical storage device is higher performing in at least one of throughput or latency.

18. The method of claim 15, further comprising:
receiving an indication from the filesystem allocator that the allocation failed;
selecting a different policy; and
providing the allocation request to the filesystem allocator, wherein the allocation request includes the different policy.

19. The method of claim 18, wherein the plurality of zones of the different policy includes single zone spanning the hybrid storage device.

20. The method of claim 15, wherein the allocator iteratively searches cluster allocation bitmaps by enumerating one or more search spaces from the policy, and for each search space, enumerating one or more cluster allocation bitmaps.

* * * * *